Figure 1:
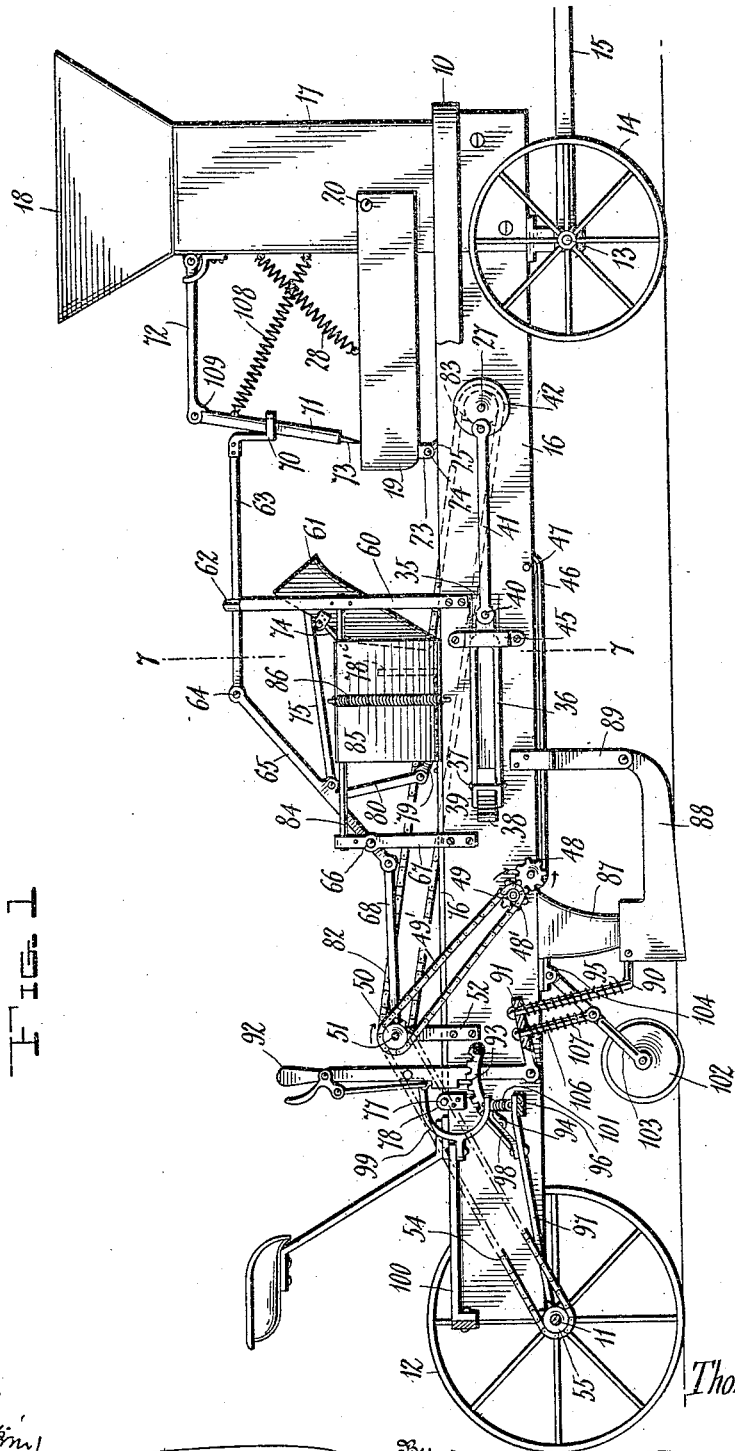

T. J. KELLY.
POTATO PLANTING MACHINE.
APPLICATION FILED MAY 10, 1909.

956,583.

Patented May 3, 1910.
4 SHEETS—SHEET 2.

Witnesses

Inventor
Thomas J. Kelly
By
Attorneys

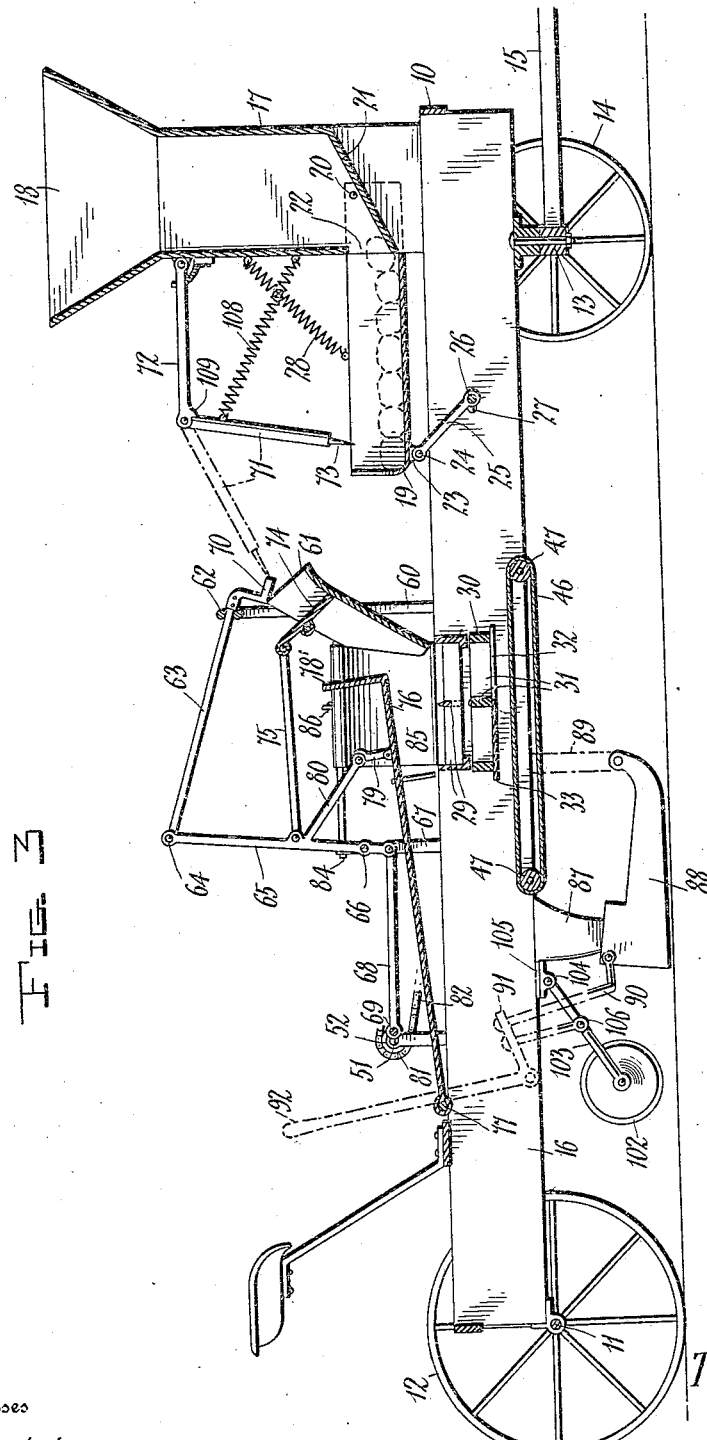

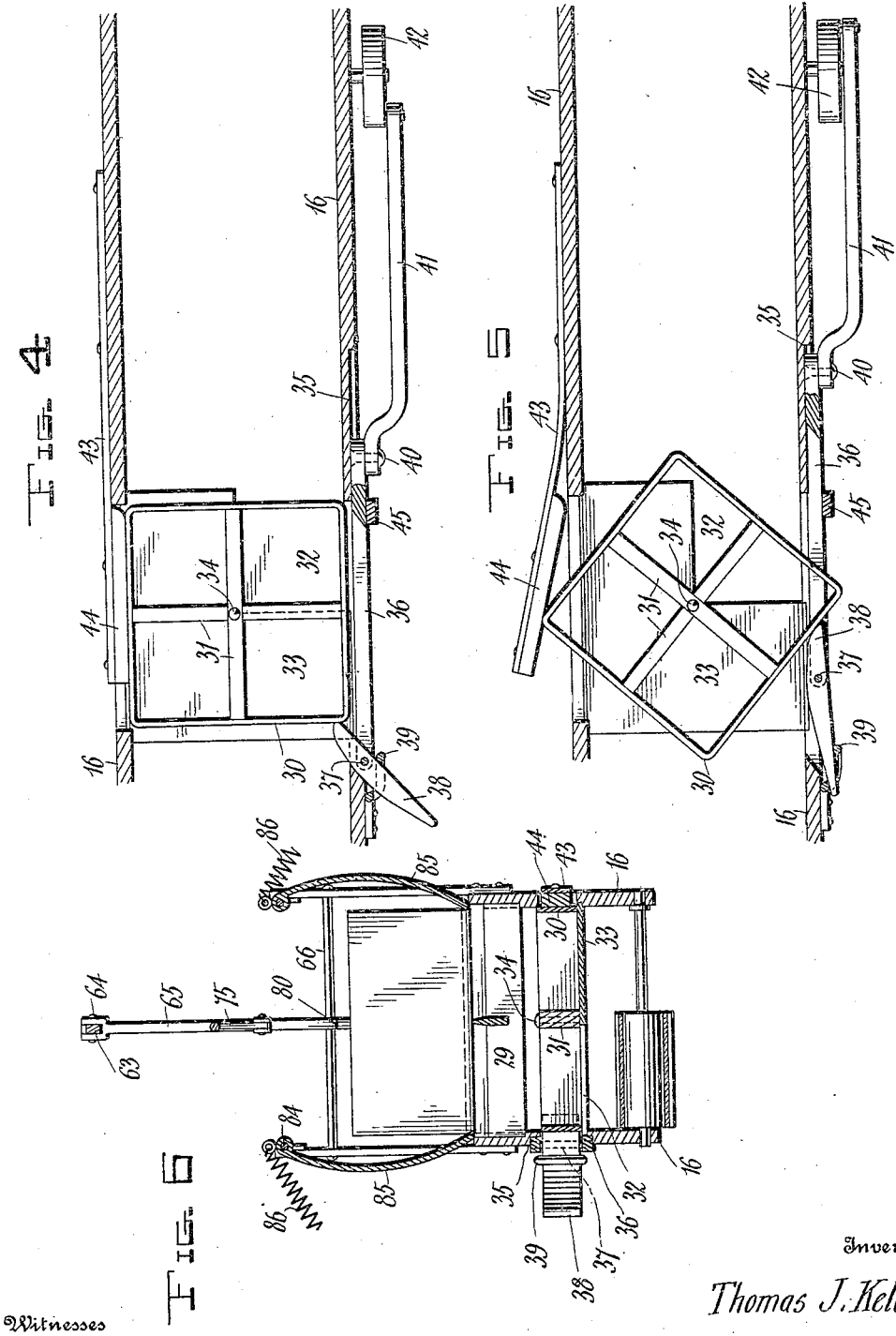

UNITED STATES PATENT OFFICE.

THOMAS J. KELLY, OF FOSSTON, MINNESOTA.

POTATO-PLANTING MACHINE.

956,583. Specification of Letters Patent. Patented May 3, 1910.

Application filed May 10, 1909. Serial No. 494,956.

*To all whom it may concern:*

Be it known that I, THOMAS J. KELLY, a citizen of the United States, residing at Fosston, in the county of Polk, State of Minnesota, have invented certain new and useful Improvements in Potato-Planting Machines; and I do hereby declare the following to be a full, clear, and exact description of the invention, such as will enable others skilled in the art to which it appertains to make and use the same.

The invention relates to a potato planter and more particularly to that class of machines for cutting and depositing the cut potato into an open furrow in a field and adapted to be drawn by horse power.

The primary object of the invention is the provision of a machine of this character in which potatoes are supported and automatically conveyed to a cutting element or slicer which latter is adapted to slice the potato into quarter pieces that are subsequently delivered singly into an open furrow at predetermined distances with respect to each other during the advancement of the machine over a field, and means for closing the opened furrow after the deposit of the pieces of potatoes therein.

Another object of the invention is the provision of a machine of this character which will automatically drop pieces of potatoes at suitable distances apart into an open furrow in a field and means for opening a furrow and covering the pieces of potatoes dropped therein.

A further object of the invention is the provision of a machine of this character which is adapted to be drawn by draft animals in a field for the planting of pieces of potatoes at suitable intervals in an opened furrow which latter is closed upon the advancement of the machine to cover the deposits dropped within the furrow.

A still further object of the invention is the provision of a potato planter which will be as light as possible consistent with strength, efficient and thoroughly reliable in operation, and economical and inexpensive in the manufacture.

In the drawings accompanying and forming part of this specification is illustrated the preferred form of embodiment of the invention to enable those skilled in the art to carry the invention into practice, will be hereinafter more fully described in detail, while the novelty of the invention will be brought out in the claims hereunto appended.

It is to be understood that changes, variations and modifications may be made such as come properly within the scope of the appended claims, without departing from the spirit of the invention or sacrificing any of its advantages.

Figure 2:
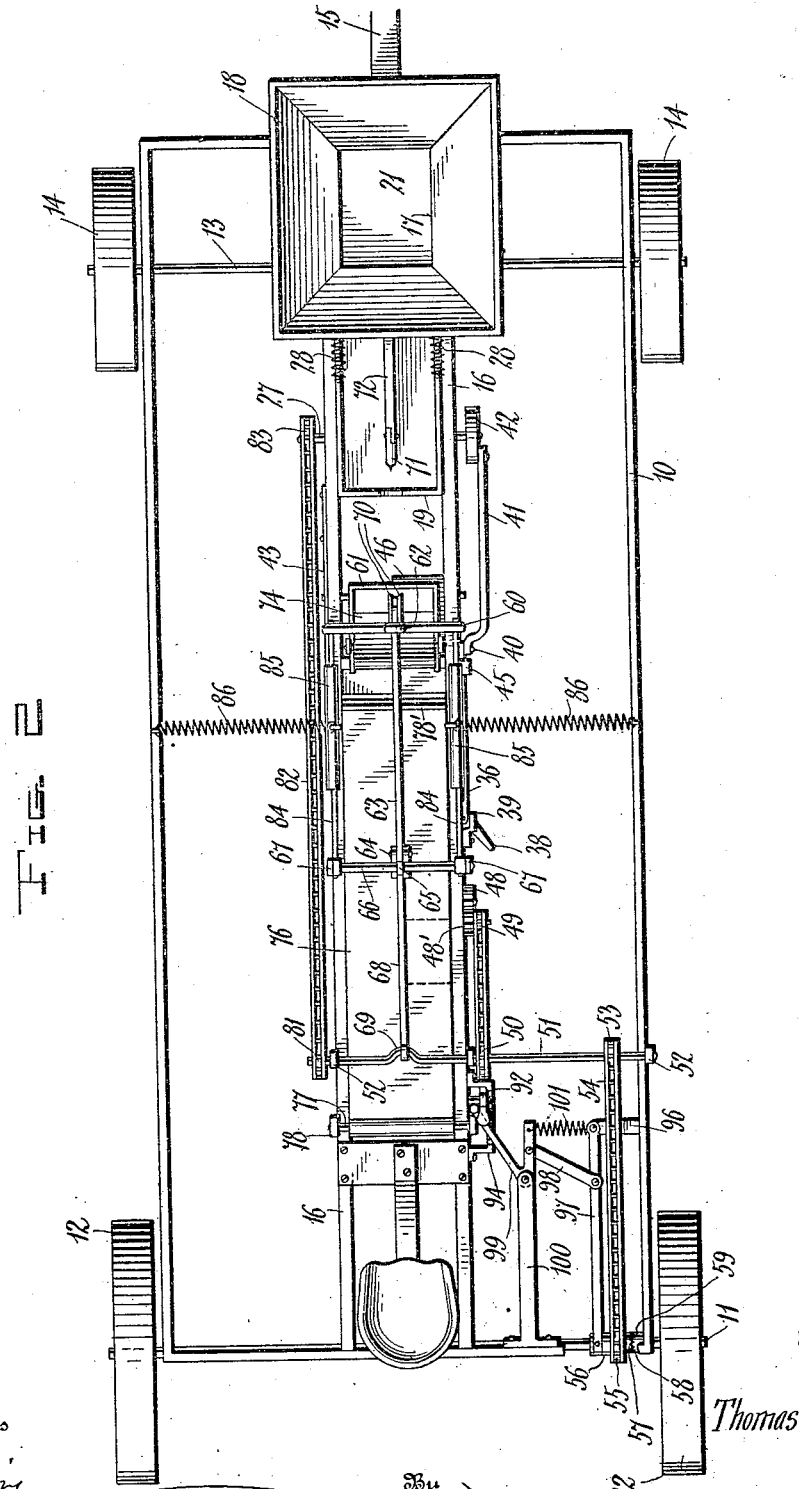

In the drawings:—Figure 1 is a side elevation of a machine constructed in accordance with the invention. Fig. 2 is a top plan view thereof. Fig. 3 is a longitudinal sectional view. Fig. 4 is a fragmentary horizontal sectional view showing in detail the normal position of the rotary delivery element and its operating mechanism. Fig. 5 is a similar view with the delivery element in a shifted position and showing the manner of rotation thereof. Fig. 6 is a sectional view on the line 7—7 of Fig. 1.

Similar reference characters indicate corresponding parts throughout the several views in the drawings.

In the drawings, the numeral 10 designates the main supporting frame of the machine which is preferably of skeleton form and composed of metal side and end bars united together to provide a rigid unitary frame structure. Mounted in suitable bearings at the rear end of the main frame 10, is a main driving shaft 11, which forms the rear axle to opposite ends of which are fixed rear traction wheels 12, and at the front end of the said main frame is a front turning axle 13, having journaled thereon at opposite ends the front traction guide wheels 14, and connected in the usual manner to the front axle is a draft pole or tongue 15, to which are adapted to be hitched draft animals for drawing the machine over a field.

Mounted centrally of and coextensive with the length of the main frame 10, are spaced parallel side sections or boards 16, which latter are rigidly mounted upon the main frame in any desirable manner and rising therefrom at the forward end is a vertically disposed hopper 17, having a flared mouth portion 18, and into which are introduced potatoes for the purpose as will be hereinafter described. Extending rearwardly of the hopper 17, is a delivery tray or platform 19, the same being connected to the sides of the hopper by pivots 20, to permit rocking movement to be imparted to the said tray or platform. The said hopper is provided with an inclined bottom 21, above which is arranged a discharge opening 22, to establish communication between the hopper and the said tray or platform to permit the delivery of potatoes from said hopper to the tray or platform.

Depending from the bottom of the tray or platform 19, at its outer end is an ear 23, to which is connected by a pivot 24, a rod or link 25, the latter also loosely connected to a crank 26, of a transversely disposed rotatable shaft 27, the same being journaled in the side sections 16, of the machine and in this manner the said tray or platform is rocked to agitate the potatoes supported therein so that the same will be fed rearwardly to the delivery end of the tray or platform. Connected to the side walls of the tray or platform 19, are tension springs 28, which latter are also connected to the hopper so as to hold the tray or platform yieldable and under tension when operated by the crank shaft through the medium of the connecting rod or link between the same.

Located approximately at a central point of the main frame and mounted between the side sections 16, is a cutting device comprising vertically disposed cutting blades 29, the same intersecting and crossing each other to divide a potato contacting therewith into four parts or pieces to be subsequently planted. Immediately below the cutting device is a rotatable frame 30, which is preferably of rectangular shape and has rigidly mounted therein vertically disposed crossing partitions 31, to divide the said frame into four receiving spaces corresponding to the spaces between the cutting blades 29, and these spaces are adapted to register with each other so that upon cutting a potato by the blades the severed pieces will drop into the spaces formed by the partitions in the rotatable frame, which pieces will be automatically deposited or fed singly to an opening 32, contained in a base plate 33, mounted in the side pieces immediately below the rotatable frame and to which the rotatable frame 30 is centrally connected by a spindle 34.

The opposite side sections are suitably cut away to permit the rotation of the frame 30, and mounted in a guide recess 35, in the exterior face of one of the side sections 16, is a forked slidable member 36, between which forks thereof near the free ends of the same is connected by a pivot 37, a swinging dog or pawl 38, the inner end of which is adapted to engage the corners of the rotatable frame 30, when the forked member 36, is being moved in one direction to impart a quarter turn of rotation to said frame and to effect the proper engagement of the dog or pawl 38, with the said frame 30, to turn the same this pawl or dog has its outer end engaging an offset eye or loop 39, fixed exteriorly to the side section rearwardly of the guide recess. To the opposite end of the forked member 36, is connected by a pivot 40, one end of a pitman rod 41, the opposite end thereof being eccentrically pivoted to a rotatable disk 42, fixed to the shaft 27, whereby reciprocating movement will be imparted to the forked member 36, to operate the pawl or dog 38, for its engagement and disengagement with the rotatable frame 30 to operate the latter.

Secured exteriorly on the opposite side section 16, is a flat spring member 43, the same having fixed thereto at its free end a contacting plate 44, to frictionally engage the sides of the frame 30, to assist in the turning thereof and also to prevent the same from turning more than a quarter rotation upon the stroke of the forked member in one direction. This forked member is held against displacement in the guide recess 35, by a cross strap or piece 45, extending across the guide recess outside of the said forked member.

Below the base or supporting plate 33, in the path of its discharge opening 32, is an endless conveyer belt 46, which latter is trained over spaced rollers 47, suitably journaled in the side sections 16, and to one of the journaled ends of the rollers is fixed a gear 48, meshing with a gear 48′, with which is fixed a sprocket wheel 49, over which is trained a sprocket chain 49′, the same being also trained over a sprocket wheel 50, fixed to one end of a driven shaft 51, journaled in bearings 52, fixed to the side sections 16, and this driven shaft has fixed thereto a further sprocket wheel 53, over which is trained the main driving chain 54, which is also trained over a sprocket wheel 55, carried by a hub 56, loosely surrounding the driving shaft 11. The hub 56, is formed with clutch teeth 57, to enmesh with clutch teeth 58, on a collar 59, fixed to said driving shaft 11, to permit the starting and stopping of the machine at the will of an operator.

Rising vertically from the side sections 16, between the cutting device and tray or platform is a yoke frame 60, to which is fixed a downwardly inclined chute 61, through which are delivered potatoes to the cutting device from the tray or platform 19, in the manner as will be hereinafter described. Formed centrally in the yoke frame 60, is a guide eye 62, through which slides a reciprocating arm 63, one end of which is connected by a pivot 64, to an oscillating lever 65, the same fulcrumed as at 66, near its lower end in a standard or upright 67, rising from and secured to the side section, and this lever 65 has its lower end pivotally connected to a link or throw rod 68, which is also connected to a crank 69, formed in the driven shaft 51 through the medium of which the said lever 65, is actuated.

To the opposite free end of the arm 63 are connected yieldable grab fingers 70, the same being adapted to engage and operate a bar 71, which is pivoted at its upper end to and depends from a bracket 72, fixed to the hopper. The lower end of the bar is provided with a spiked or pointed needle member 73, which upon manipulation of the bar 71, is adapted to be forced into a single potato contained in the tray or platform 19, and which potato is raised therefrom and by the grab fingers 70, is deposited in the chute 61, which delivers the same to the cutting device.

Pivotally mounted upon the chute 61, for swinging movement is a shut off gate or door 74, which latter is operated by means of a connecting rod 75, pivoted thereto and to the oscillating lever 65, and this gate or door prevents a potato deposited in the chute from prematurely being delivered to the cutting device prior to the raising of a presser device hereinafter described.

The presser device comprises a plate 76, having hinged connection at one end with a rod 77, supported in ears 78, on the side sections of the machine. The opposite end of the plate 76, is bent at right angles thereto, to form a guard extension or deflector 78', which prevents the escape of potatoes from the cutting device when delivered from the chute 61, during the operation of the machine. The presser device is raised and lowered by a pivotal connecting link 79, with an extension 80, of the oscillating lever 65, and upon the lowering of the presser device it forces a potato delivered from the chute 61, downwardly against the blades 29, of the cutting device so that they will be forced through the potato to sever it into four pieces to be subsequently deposited singly in successive order on to the endless conveyer which latter will drop the same into an opened furrow as the machine is advanced over a field.

Fixed to the driven shaft 51 is a sprocket wheel 81, having trained thereover a chain 82, the latter being also trained over a sprocket wheel 83, fixed to the shaft 27, and in this manner motion is conveyed to the rotatable frame 30, of the machine.

Depending from horizontally disposed bars or rods 84, are hinged centering wings or plates 85, which are curved inwardly at their lower free extremities to converge toward each other and these centering plates or wings 85, have connected thereto retractile springs 86, which latter serve to hold the inwardly curved extremities of said plates or wings normally in contact and also to permit the spreading thereof upon the lowering of the presser device between the plates or wings. It is obvious that the said wings or plates 85, serve to position a potato received from the chute 61, directly over the crossing point of the blades 29, so that the latter will cut the potato into four parts when acted upon by the presser device.

Directly in rear of the endless conveyer 46, at its delivery end is a conducting tube or drill spout 87, the discharge mouth of which is disposed between furrow openers in the form of shoes 88, the forward ends of which are pivoted to a depending bracket 89, and to the rear ends of the openers 88, is pivotally connected a stem 90, which is loosely connected to the L-arm 91 of a manually operable lever 92, the same provided with the usual hand actuated spring controlled locking pin 93, engaging a toothed rack or segment 94, mounted upon one of the side sections and the manually operable lever 92, is adapted to adjust the furrow openers to regulate the depth of cutting action thereof. Surrounding the stem 90, is a coiled expansion spring 95, which serves to hold the furrow openers yieldable whereby the same will be capable of overriding an obstruction such as roots or stones upon the ground.

Extending inwardly from one side bar of the main frame 10, (see Fig. 2) is a bracket or ear 96, to which is pivotally connected a forked lever 97, which latter has connection with the hub 56, to enable the same to be clutched and unclutched with the driving shaft 11, at the will of an operator. The lever 97 is operated by means of a link connection 98, pivotally connected to a swinging piece 99, supported by a fixed bracket 100, and this piece is arranged in the path of movement of the manually operable lever 92, so that when the latter is thrown in one direction the hub 56, will be shifted to unclutched position. Connected to the swinging piece 99, is a retractile spring 101, which normally holds the said hub 56 in clutched engagement with the driving shaft. In rear of the drill spout 87, travels furrow closer disks 102, journaled between the forks of a swinging leg 103, pivoted to a bearing 104, suitably mounted to a cross piece 105, connected to the lower edges of the side sections 16. Pivoted to the leg 103, is a stem 106, the latter loosely connected to the extension 91, of the manually operable lever 92, and surrounding this stem 106, is a coiled expansion spring 107, which acts to hold the furrow closers in working position and to permit them to trip or override any obstruction in the ground with which they may contact, thus overcoming any possibility of injury thereto.

Connected to the bars 71, and the hopper is a spring 108, which holds the said bar under tension and normally against a stop lug 109, on the bracket 72, pivotally supporting the bar.

From the foregoing it is believed that the construction and operation of the invention will be clearly apparent without the necessity of a more extended explanation, therefore the same has been omitted.

What is claimed is:—

1. In a potato planter, a wheeled support, a hopper rising from the said support and having a discharge opening, a tray pivotally connected to the hopper and in communication with its discharge opening and adapted for raising and lowering movement on its pivot, a cutter carried by the support, a tilting chute disposed above the cutter, mechanism for delivering a single potato from the tray to the chute, means centering the potato relative to the cutter, presser means acting upon the potato to effect the severing thereof by the cutter, and mechanism for delivering severed pieces of potato to an open furrow.

2. In a potato planter, a wheeled frame, a hopper supported by said frame, a tilting tray communicating with the hopper, a cutter device supported by the frame, a chute leading to the cutter device, a cutoff for said chute, means to engage a single potato in the tray, mechanism for transferring a potato supported by the potato engaging means to the chute, a connection between the cutoff and last named mechanism, and a single delivery means below said cutoff device to deposit said severed pieces of a potato to the ground.

3. In a potato planter, a wheeled frame, a hopper supported by said frame, a tilting tray communicating with the hopper, a cutter device supported by the frame, a chute leading to the cutter device, a cutoff for said chute, means to engage a single potato in the tray, mechanism for transferring a potato supported by the potato engaging means to the chute, a connection between the cutoff and last named mechanism, a single delivery means below said cutoff device to deliver severed pieces of potatoes to the ground, driven connections operative by a pair of the wheels of the frame to impart movement simultaneously to the transferring mechanism and the single delivery means.

4. In a machine of the class described, a hopper, a shaking tray in communication with the hopper, a cutter, mechanism conveying a single potato from the tray to the cutter and mechanism successively delivering a single piece of potato to the ground.

5. In a machine of the class described, a hopper, a shaking tray in communication with the hopper, a cutter, mechanism conveying a single potato from the tray to the cutter, mechanism successively delivering a single piece of potato to the ground, and means driven upon the travel of the machine to simultaneously operate said mechanisms.

6. In a machine of the class described, a hopper, a shaking tray in communication with the hopper, a cutter, mechanism conveying a single potato from the tray to the cutter, mechanism successively delivering a single piece of potato to the ground, means driven upon the travel of the machine to simultaneously operate said mechanisms, and means controlling the last named means.

7. In a machine of the class described, a hopper, a shaking tray in communication with the hopper, a cutter, mechanism conveying a single potato from the tray to the cutter, mechanism successively delivering a single piece of potato to the ground, means driven upon the travel of the machine to simultaneously operate said mechanisms, means controlling the last named means, and means centering a potato relative to the cutter.

8. In a machine of the class described, a hopper, a shaking tray in communication with the hopper, a cutter, mechanism conveying a single potato from the tray to the cutter, mechanism successively delivering a single piece of potato to the ground, means driven upon the travel of the machine to simultaneously operate said mechanisms, means controlling the last named means, means centering a potato relative to the cutter, and pressure means adapted to force a potato through the cutter.

In testimony whereof, I affix my signature, in presence of two witnesses.

THOMAS J. KELLY.

Witnesses:
  CHAS. L. CONGER,
  A. I. SOLBERG.